(12) United States Patent
Oboza et al.

(10) Patent No.: US 9,444,234 B2
(45) Date of Patent: Sep. 13, 2016

(54) SWITCHGEAR INCLUDING A WITHDRAWABLE SWITCHGEAR UNIT HAVING A BLOCKING MECHANISM

(71) Applicant: General Electric Company, Schenectady, NY (US)

(72) Inventors: Rafal Marcin Oboza, Slaskie (PL); Jozef Zbigniew Bedkowski, Slaskie (PL); Rafal Michal Burzynski, Slaskie (PL); Lukasz Kuboszek, Slaskie (PL); Marcin Andrzej Pruski, Slaskie (PL); Michal Marek Roziecki, Slaskie (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 171 days.

(21) Appl. No.: 14/289,202

(22) Filed: May 28, 2014

(65) Prior Publication Data

US 2015/0349502 A1 Dec. 3, 2015

(51) Int. Cl.
  *H02B 11/173* (2006.01)
  *H02B 1/30* (2006.01)
  *H02B 1/36* (2006.01)

(52) U.S. Cl.
  CPC ............... *H02B 11/173* (2013.01); *H02B 1/30* (2013.01); *H02B 1/36* (2013.01)

(58) Field of Classification Search
  CPC .................. G06F 1/16; G06F 1/1601–1/1611; G06F 1/1613–1/1698; G06F 1/18–1/189; H05K 5/00–5/069; H05K 7/00–7/186; H05K 7/20218–7/20381; H05K 7/20409–7/20418; H05K 7/20009–7/202; H01L 23/367–23/3677; H01L 23/473; H01L 23/46–23/467; H02B 11/173; H02B 1/30–1/36

USPC ............ 361/679.01–679.45, 679.55–679.61, 361/724–727, 679.26–679.3, 361/679.31–679.39, 756, 741, 686, 687, 361/688, 696, 697, 787, 789, 794, 701–703, 361/709, 807–810; 455/575.1–575.9; 348/787, 789, 794; 349/56–60; 312/223.1–223.3
  See application file for complete search history.

(56) References Cited

U.S. PATENT DOCUMENTS 3,573,561 A   4/1971   Beebe
6,018,455 A * 1/2000   Wilkie, II ............... H02B 1/21
                                                        165/80.3

(Continued)

FOREIGN PATENT DOCUMENTS

CN   202217953 U   5/2012
CN   103094859 A   5/2013

(Continued)

OTHER PUBLICATIONS

N.A., "Air Circuit Breakers", Siemens AG, 2013, pp. 1-70.

*Primary Examiner* — Anthony Haughton
*Assistant Examiner* — Razmeen Gafur
(74) *Attorney, Agent, or Firm* — GE Global Patent Operation; Stephen G. Midgley

(57) ABSTRACT

A switchgear includes a housing having first and second side walls and at least one shelf member. The at least one shelf member includes a guide element. A withdrawable switchgear unit is slidingly supported on the at least one shelf member. A blocking mechanism is mounted to the withdrawable switchgear unit. The blocking mechanism includes a guide pin arranged in the guide element and a blocking pin operatively connected to the guide pin. The blocking pin selectively restricts movement of the withdrawable switchgear unit between at least two operational positions.

14 Claims, 7 Drawing Sheets

(56) References Cited

U.S. PATENT DOCUMENTS

| | | | | |
|---|---|---|---|---|
| 6,072,159 A * | 6/2000 | Wilkie, II | H02B 1/32 | 219/403 |
| 6,088,219 A * | 7/2000 | Yanniello | H02B 1/38 | 174/67 |
| 6,145,943 A * | 11/2000 | Reuter | H02B 1/32 | 312/223.1 |
| 6,155,660 A * | 12/2000 | Nicolai | H02B 1/54 | 248/635 |
| 6,229,690 B1 * | 5/2001 | Fivelstad | H02B 13/02 | 174/50.54 |
| 6,388,868 B1 * | 5/2002 | Leccia | H02B 11/133 | 200/50.12 |
| 6,454,368 B1 * | 9/2002 | Bedau | H01R 13/518 | 312/223.1 |
| 6,791,027 B1 * | 9/2004 | Nicolai | H02B 1/306 | 174/17 R |
| 7,022,923 B2 | 4/2006 | Liebetruth | | |
| 7,277,273 B2 * | 10/2007 | Smith | H05K 7/1488 | 211/26 |
| 8,189,325 B2 * | 5/2012 | Kurogi | H02B 13/01 | 218/157 |
| 8,251,785 B2 * | 8/2012 | Schmitt | H05K 7/1497 | 361/695 |
| 8,451,589 B2 * | 5/2013 | Milovac | H02B 11/26 | 361/611 |
| 8,717,745 B2 * | 5/2014 | Frigiere | H01H 9/52 | 165/104.19 |
| 8,743,532 B2 * | 6/2014 | Yano | H02B 1/56 | 165/104.33 |
| 8,926,030 B2 * | 1/2015 | Roth | H02B 1/01 | 312/111 |
| 2003/0035264 A1 * | 2/2003 | Hartel | H05K 7/20572 | 361/678 |
| 2007/0091550 A1 * | 4/2007 | Smith | H05K 7/1488 | 361/679.02 |
| 2007/0111575 A1 * | 5/2007 | Jensen | H01R 13/6315 | 439/246 |
| 2007/0158053 A1 * | 7/2007 | Nicolai | F24F 5/00 | 165/122 |
| 2010/0187956 A1 * | 7/2010 | Roth | A47B 47/0041 | 312/223.1 |
| 2011/0110049 A1 * | 5/2011 | Lehtola | H05K 7/1409 | 361/724 |
| 2011/0216508 A1 * | 9/2011 | Faulkner | H05K 5/00 | 361/724 |
| 2012/0112610 A1 * | 5/2012 | Roth | H02B 1/32 | 312/223.1 |
| 2012/0216393 A1 * | 8/2012 | Ballard | H01F 27/02 | 29/602.1 |
| 2013/0170104 A1 | 7/2013 | Kim | | |
| 2013/0264178 A1 | 10/2013 | Fleitmann et al. | | |
| 2014/0177148 A1 * | 6/2014 | Schurr | H05K 5/0017 | 361/679.01 |

FOREIGN PATENT DOCUMENTS

| | | |
|---|---|---|
| CN | 203014245 U | 6/2013 |
| JP | 2002262417 A | 9/2002 |
| WO | 2008122533 A1 | 10/2008 |

\* cited by examiner

US 9,444,234 B2

SWITCHGEAR INCLUDING A WITHDRAWABLE SWITCHGEAR UNIT HAVING A BLOCKING MECHANISM

BACKGROUND OF THE INVENTION

The subject matter disclosed herein relates to the art of electric switchgear and, more particularly, to switchgear including a withdrawable switchgear unit having a blocking mechanism.

In general, a switchgear serves as an interface between an electrical supply and an electrical load. The switchgear is arranged in an enclosure that includes a line or busbar portion and a load or circuit breaker portion. The busbar portion includes one or more busbars that are connected to the electrical supply. The circuit breaker portion includes one or more circuit breakers that are electrically connected to the one or more busbars and an electrical load. The circuit breaker is configured to interrupt a flow of current from the one or more busbars to the electrical load in the event of an over-current condition, short circuit condition and/or an over/under voltage condition.

In some cases, the one or more circuit breakers are mounted to a withdrawable unit. A withdrawable unit may be shifted relative to a shelf in the switchgear. The withdrawable unit may be shifted between a service position, a test position, and a disconnected position. Each position establishes a corresponding configuration, e.g., (service configuration, a testing configuration, and/or a disconnected configuration, for the one or more circuit breakers.

BRIEF DESCRIPTION OF THE INVENTION

According to an aspect of an exemplary embodiment, a switchgear includes a housing having first and second side walls and at least one shelf member. The at least one shelf member includes a guide element. A withdrawable switchgear unit is slidingly supported on the at least one shelf member. A blocking mechanism is mounted to the withdrawable switchgear unit. The blocking mechanism includes a guide pin arranged in the guide element and a blocking pin operatively connected to the guide pin. The blocking pin selectively restricts movement of the withdrawable switchgear unit between at least two operational positions.

According to another exemplary embodiment, a withdrawable switchgear unit includes a blocking mechanism, a guide pin extending from the blocking mechanism into a guide element of a switchgear, and a blocking pin operatively connected to the guide pin. The blocking pin selectively restricts movement of the withdrawable switchgear unit between at least two operational positions.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
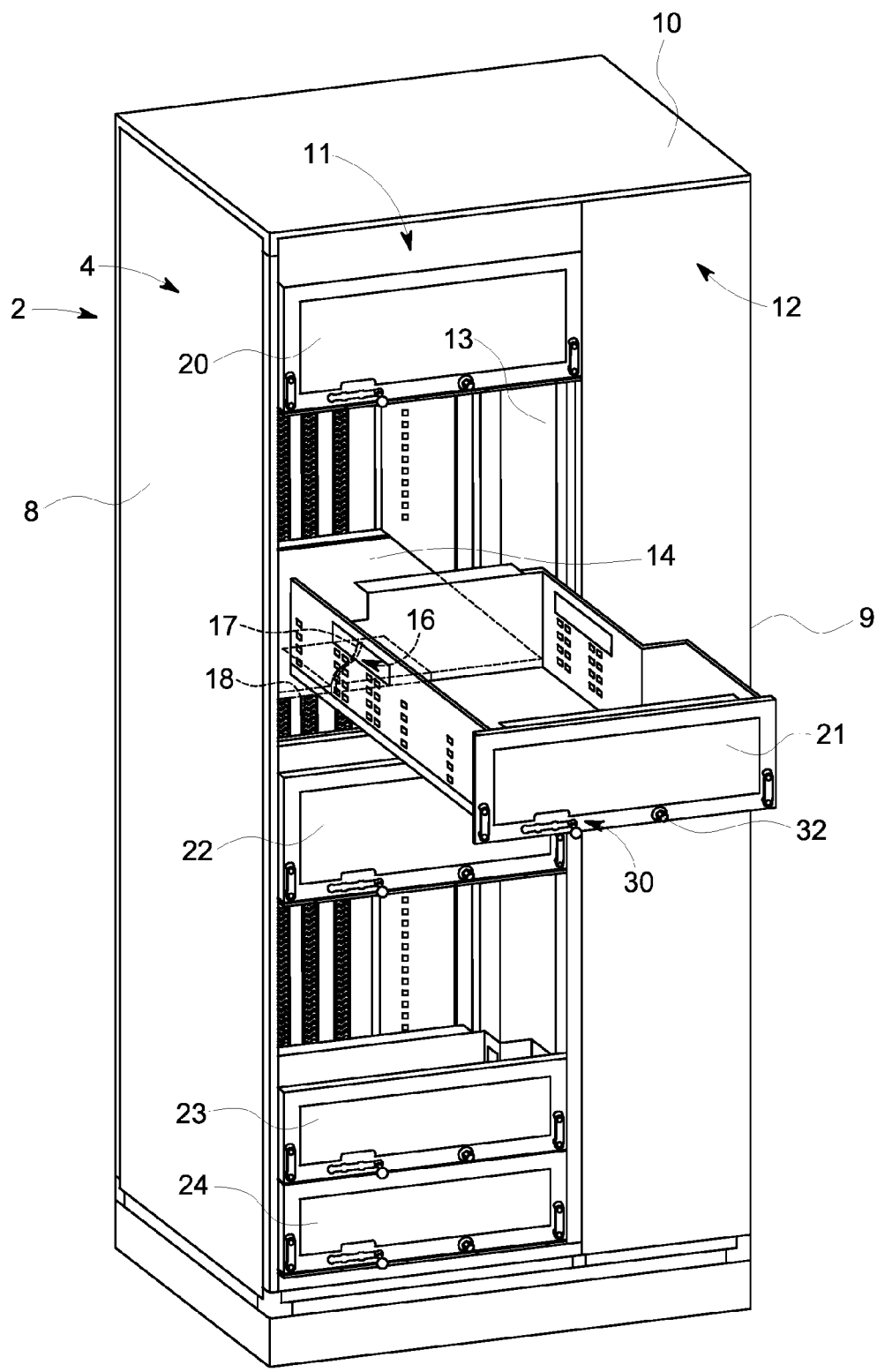
FIG. 1 is a perspective view of a switchgear including a withdrawable switchgear unit having a blocking mechanism, in accordance with an exemplary embodiment.
Figure 2:
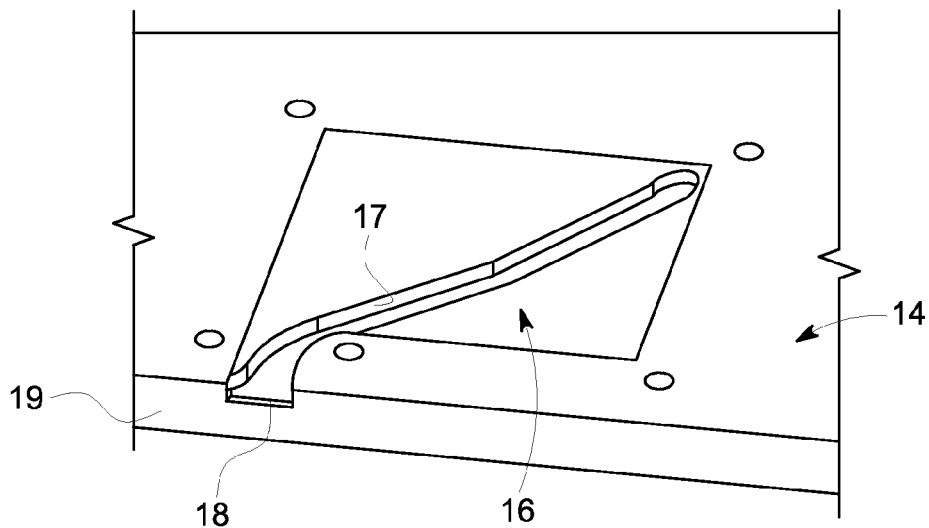
FIG. 2 is a perspective view of a guide element formed in a shelf member of the switchgear of FIG. 1.

A switchgear, in accordance with an exemplary embodiment, is generally indicated at 2, in FIG. 1. Switchgear 2 includes a housing 4 having a first side wall 8, a second side wall 9, and a top wall 10. Housing 4 includes a switchgear portion 11 and a cable compartment 12 separated by a dividing wall 13. A plurality of shelf members, one of which is indicated at 14, extends between first and second side walls 8 and 9. In the exemplary embodiment shown, shelf members 14 are supported by first side wall 8 and dividing wall 13. As shown in FIG. 2, each shelf member 14 includes a guide element 16 shown in the form of a curvilinear slot 17. Curvilinear slot 17 includes a notch or opening 18 provided at an outwardly facing front edge 19 of shelf member 14. Each of the plurality of shelf members 14 supports a corresponding withdrawable switchgear unit, five of which are indicated at 20-24. Each withdrawable switchgear unit includes a corresponding blocking mechanism, such as shown at 30, in connection with withdrawable switchgear unit 21. As will be detailed more fully below, blocking mechanism 30 selectively inhibits, or restricts, movement of withdrawable switchgear unit 21 between a disconnected position, a test position, and a service position. Each withdrawable switchgear unit 20-24 may also include a draw-in/draw-out member, such as shown at 32, in connection with withdrawable switchgear unit 21. Draw-in/draw-out member 32 may be actuated by a tool (not shown) to fully seat/un-seat withdrawable switchgear unit 21 in the service position.

Figure 3:
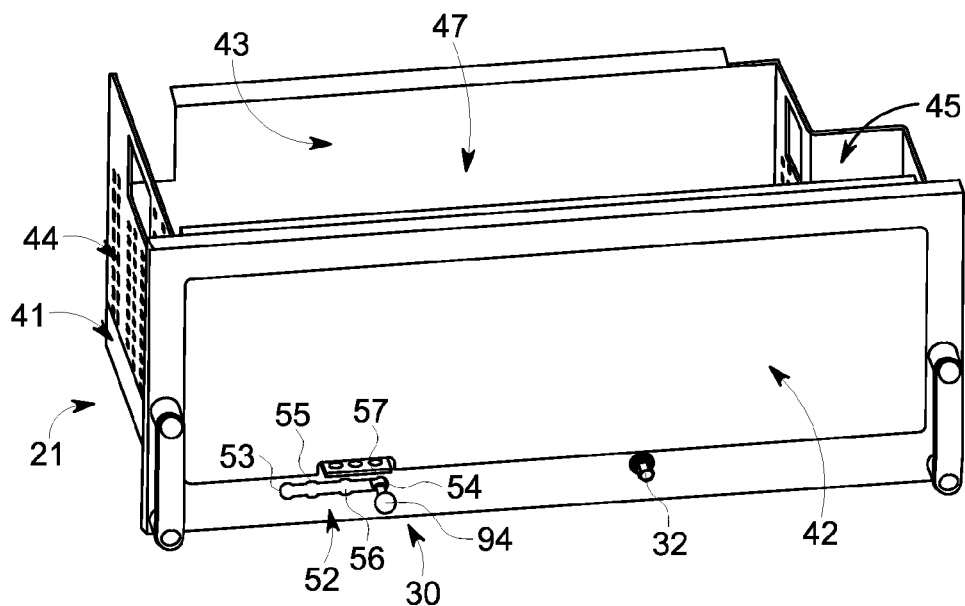
FIG. 3 is a perspective view of the withdrawable switchgear unit of FIG. 1.
Figure 4:
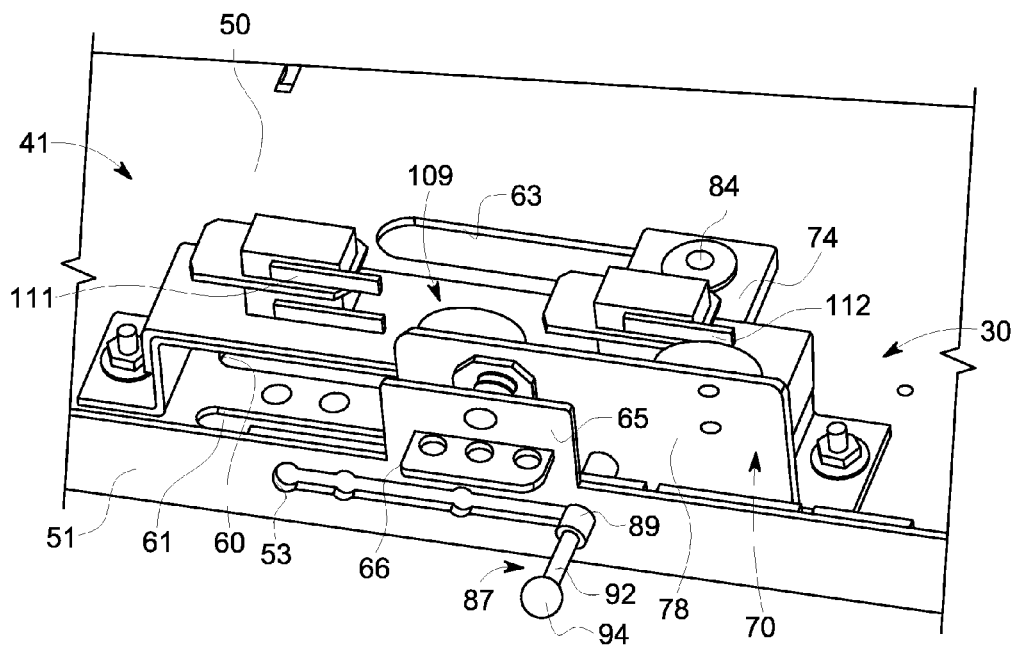
FIG. 4 is a partial perspective view of a blocking mechanism of the withdrawable switchgear unit of FIG. 3.
Figure 5:
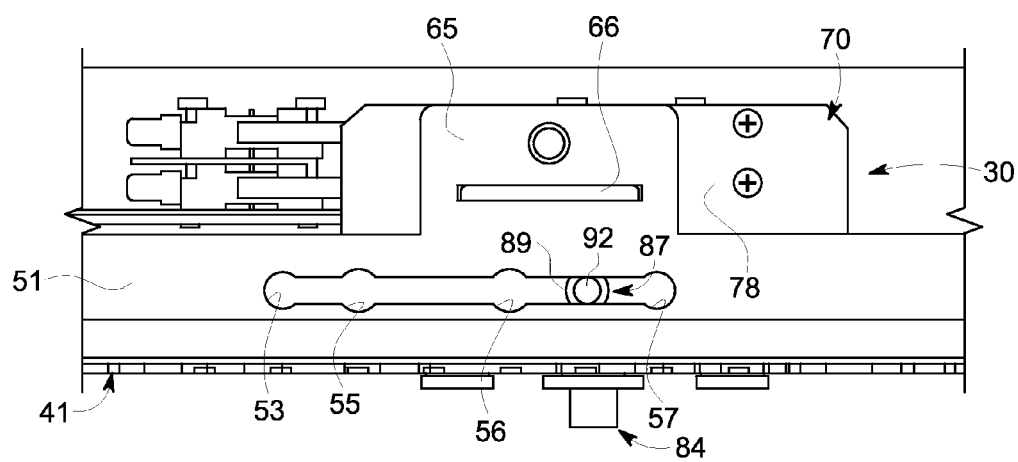
FIG. 5 is an elevational view of the blocking mechanism of FIG. 4.

Reference will now follow to FIGS. 3-5 in describing withdrawable switchgear unit 21 with an understanding that withdrawable switchgear units 20 and 22-24 may include similar features. Withdrawable switchgear unit 21 includes a base member 41 that supports a front wall 42, a mounting plate 43, a first side wall 44 and a second, opposing side wall 45. Mounting plate 43 and side walls 42-45 define a circuit breaker zone 47 within which is supported one or more circuit breaker elements (not shown). Base member 41 includes a generally planar surface 50 having an upwardly projecting forward facing edge member 51.

As will be discussed more fully below, edge member 51 includes an elongated slot member 52 extending from a first end 53 to a second end 54. Elongated slot member 52 includes a first aperture 55 spaced from first end 53, a second aperture 56, and a third aperture 57 arranged at second end 54. First, second, and third apertures 55-57 are spaced one, from another, along elongated slot member 52. Planar surface 50 is shown to include a first elongated slot 60 arranged proximate to, and running parallel with, edge member 51. A second elongated slot 61 is arranged alongside first elongated slot 60. A third elongated slot 63 is shown to be spaced from, and running parallel with, first and second elongated slots 60 and 61. Edge member 51 is also shown to include a tab section 65 that supports a lock member 66. Lock member 66 provides an interface for a lock that prevents withdrawable switchgear unit 21 from moving from the disconnected position.

Figure 6:
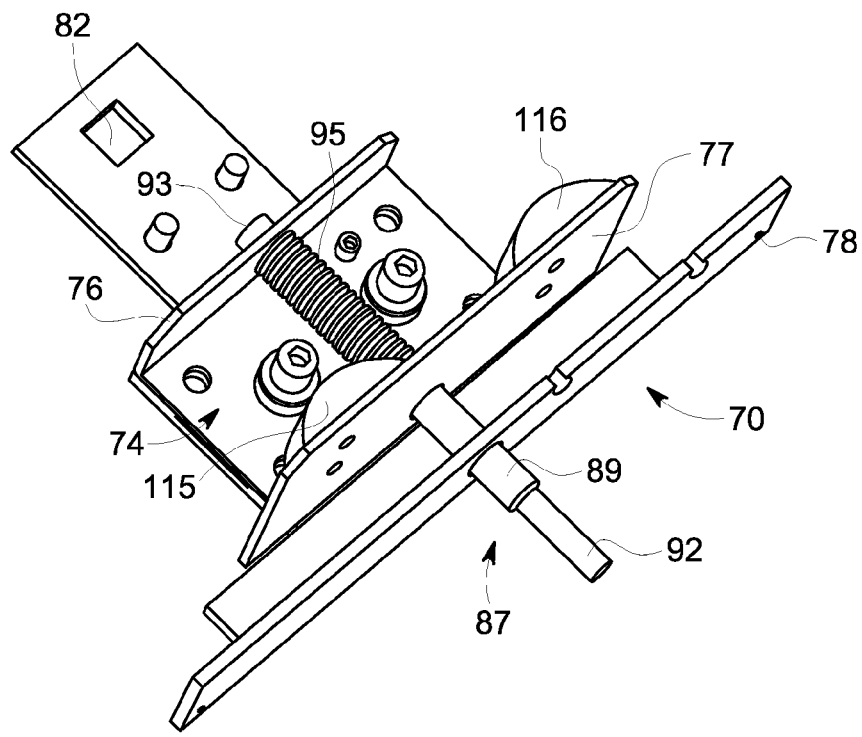
FIG. 6 is a perspective view of a shuttle of the blocking mechanism of FIG. 4.
Figure 7:
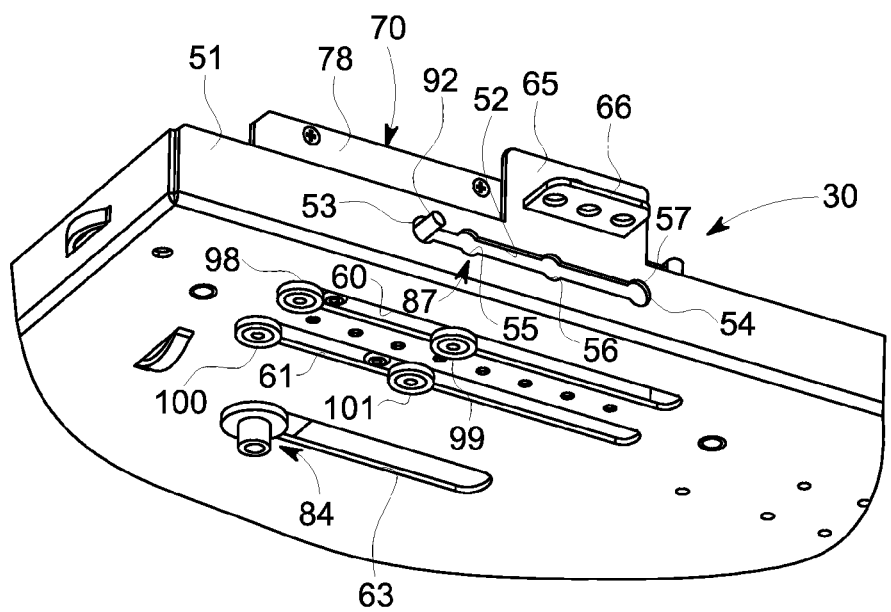
FIG. 7 is a lower perspective view of the blocking mechanism of FIG. 4 mounted to the withdrawable switchgear unit of FIG. 3 shown in an IN/OUT position.

In accordance with an exemplary embodiment, blocking mechanism 30 includes a shuttle 70 slidingly mounted to base member 41. Shuttle 70, as shown in FIG. 6, includes a base 74 that supports a first upstanding wall 76, a second upstanding wall 77, and a third upstanding wall 78. Shuttle 70 includes a guide pin opening 82 that receives a guide pin 84 (FIG. 7). Guide pin 84 extends from shuttle 70, through third elongated slot 63 and is received by guide element 16 in shelf member 14. Shuttle 70 also includes a blocking pin 87 that extends through first, second, and third upstanding walls 76-78.

Blocking pin 87 includes a first section 89 having a first diameter and a second section 92 having a second diameter. Blocking pin 87 also includes an end portion 93 that may be operatively connected to an interlock (not shown) that prevents circuit breaker (also not shown) arranged in circuit breaker zone 47 from establishing an electrical connection when withdrawable switchgear unit is not in a service position. Second section 92 may be provided with a ball or knob 94 that is no shown in subsequent drawings for clarity. The second diameter of second section 92 is smaller than the first diameter of first section 89. With this arrangement, second section 92 may pass along elongated slot member 52. First section 89 cannot move along elongated slot member 52 but may pass through one of first, second, and third apertures 55-57, as will become more fully evident below. Blocking pin 87 is biased outwardly of shuttle 70 by a spring 95 arranged between first upstanding wall 76 and a ring (not shown) may be arranged adjacent to second upstanding wall 77. Shuttle 70 is mounted to base member 41 through first, second, third and fourth bearings 98-101. Bearings 98-101 pass through first and second elongated slots 60 and 61 and connect with shuttle 70. As will be detailed more fully below, as withdrawable switchgear unit 21 is moved along shelf member 14, guide pin 84 traverses guide element 16 causing shuttle 70 to move along edge member 51 of base member 41.

In further accordance with an exemplary embodiment, blocking mechanism 30 includes a position sensor support 109 mounted to base member 41 proximate to shuttle 70. Position sensor support 109 supports a first position sensor 111 and a second position sensor 112. First and second position sensors 111 and 112 are actuated by corresponding first and second position sensor actuators 115 and 116 mounted to shuttle 70. In this manner, a signal may be sent to a controller or visual indicator providing feedback on a position of withdrawable switchgear unit 21

Figure 8:
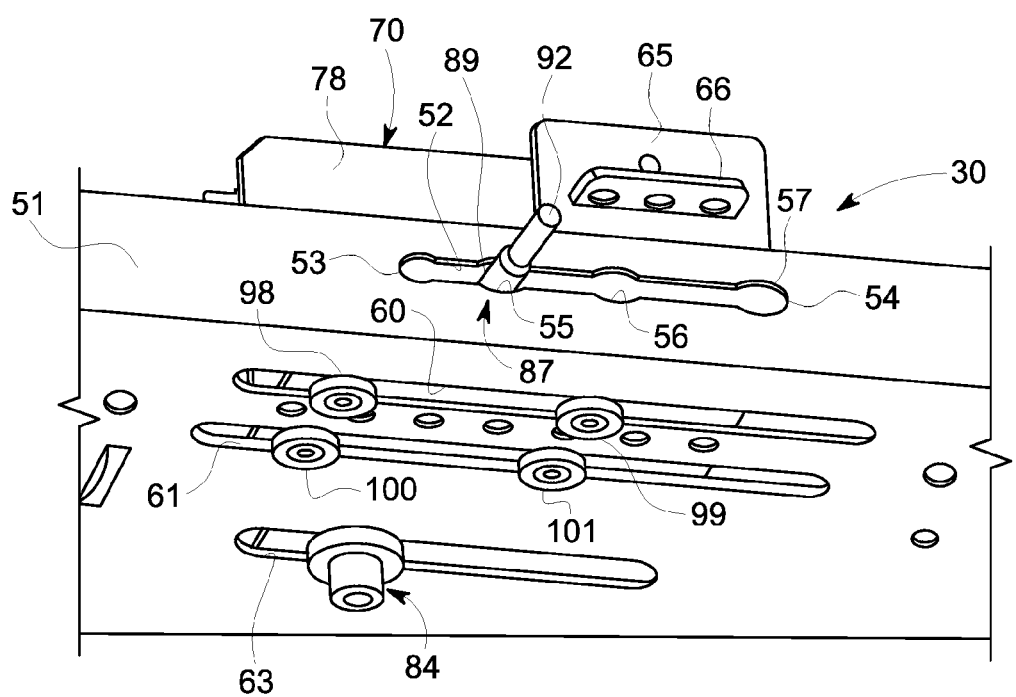
FIG. 8 is a lower perspective view of the blocking mechanism of FIG. 4 mounted to the withdrawable switchgear unit of FIG. 3 shown in a disconnect position.

In accordance with an exemplary embodiment illustrated in FIG. 7, withdrawable switch gear unit 21 may be inserted into, and removed from, housing 4 when blocking pin 87 is arranged at first end 53 of elongated slot member 52. In this position, guide pin 84 may be received into, or removed from, opening 18 in curvilinear slot 17. As withdrawble switchgear unit 21 is inserted into housing 4 along shelf member 14, blocking mechanism 30 moves to a disconnect position and blocking pin 87 extends through first aperture 55, as shown in FIG. 8. The disconnect position may exist when mounting withdrawable switchgear unit 21 on shelf member 14 during servicing of electrical components (not shown) in withdrawable switchgear unit 21, or when otherwise desired to disconnect withdrawable switchgear unit 21 from electrical service. With blocking pin 87 extending through aperture 55, withdrawable switchgear unit 21 cannot be moved along shelf member 14. More specifically, blocking pin 87 cannot move along elongated slot member 52 and thus shuttle 70 cannot transition along from edge member 51 as guide pin 84 moves along guide element 16.

Figure 9:
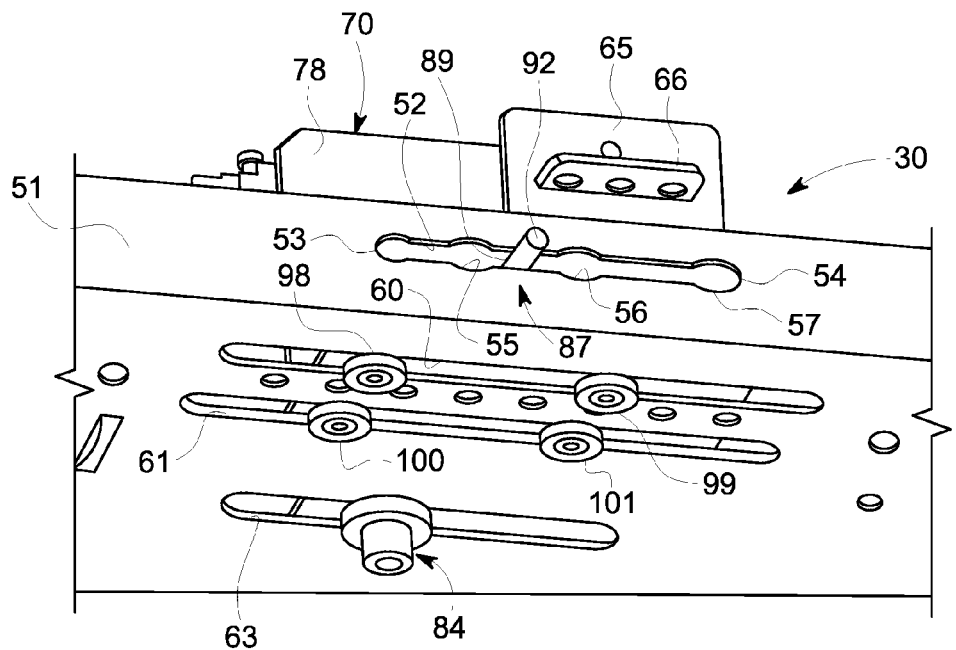
FIG. 9 is a lower perspective view of the blocking mechanism of FIG. 4 mounted to the withdrawable switchgear unit of FIG. 3 shown transitioning to a test position.
Figure 10:
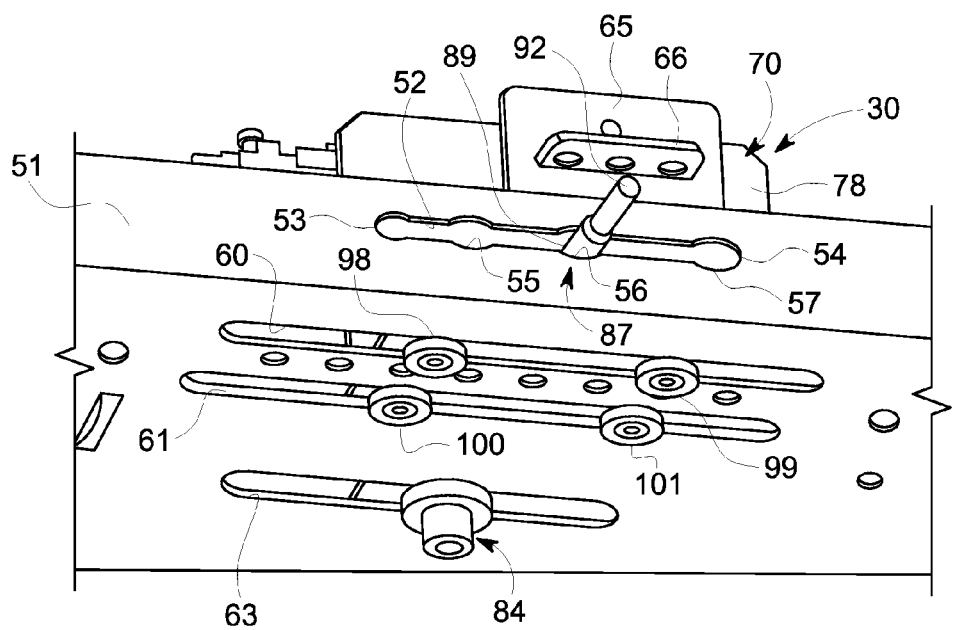
FIG. 10 is a lower perspective view of the blocking mechanism of FIG. 4 mounted to the withdrawable switchgear unit of FIG. 3 shown in the test position.

In order to move from the disconnect position to the test position, blocking pin 87 is moved inwardly against a force applied by spring 95 until first section 89 is clear of elongated slot member 52, as shown in FIG. 9. Starting from this point, an installer may employ draw-in/draw-out member 32 to move withdrawable switchgear unit 21 further into housing 4. Once first section 89 is clear of elongated slot member 52, second section 92 may slide with shuttle 70 and withdrawable switchgear unit 21 may be moved towards a test position, as shown in FIG. 10. In the test position, first section 89 extends through second aperture 56 preventing further movement. At this point, first position sensor actuator 115 activates first position sensor 111 indicating that withdrawable switchgear unit 21 is in the test position.

Figure 11:
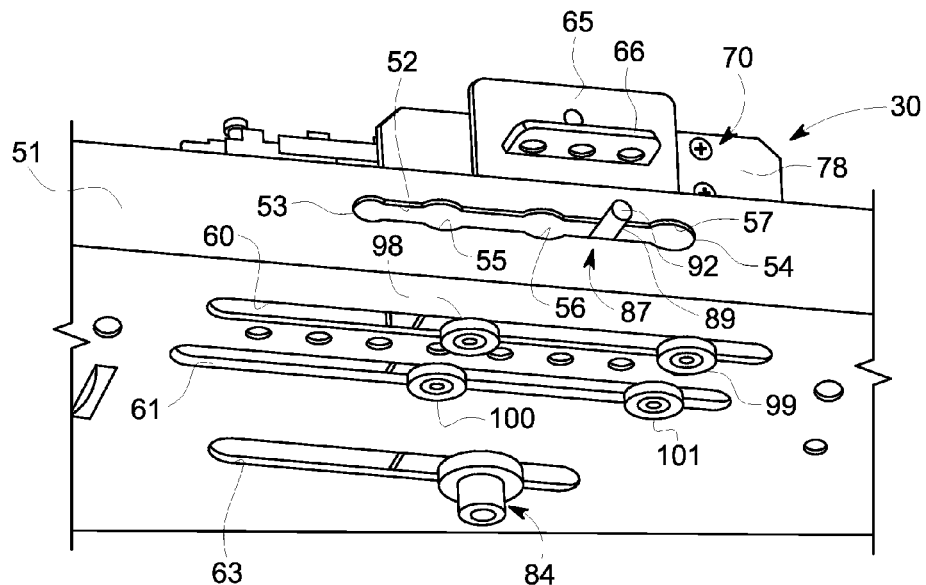
FIG. 11 is a lower perspective view of the blocking mechanism of FIG. 4 mounted to the withdrawable switchgear unit of FIG. 3 shown transitioning from the test position to a service position.
Figure 12:
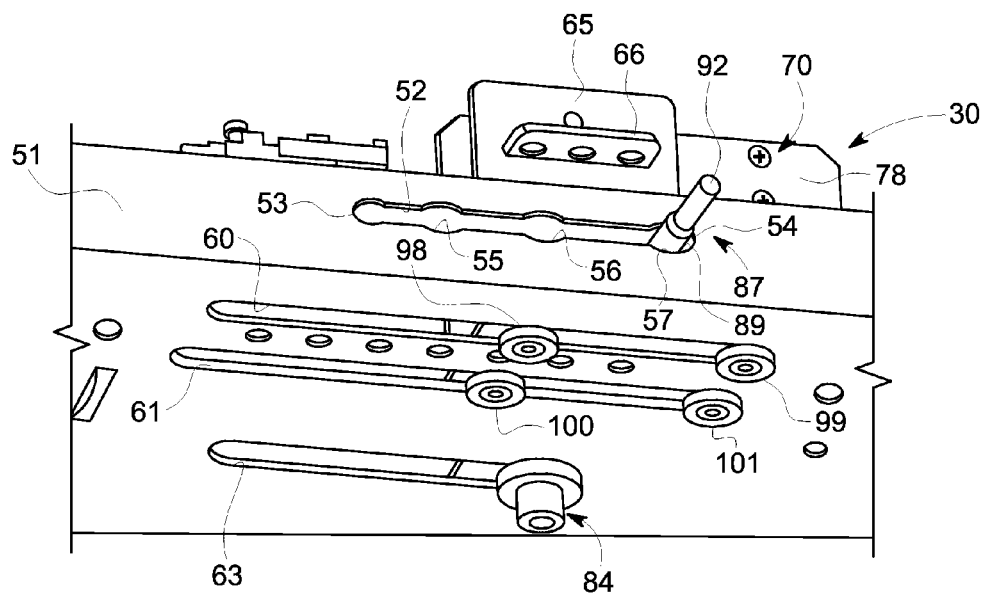
FIG. 12 is a lower perspective view of the blocking mechanism of FIG. 4 mounted to the withdrawable switchgear unit of FIG. 3 shown in the service position.

To move from the test position to the service position, blocking pin 87 is again moved inwardly against the force applied by spring 95 until first section 89 is clear of elongated slot member 52. At this point, withdrawable switchgear unit 21 may be moved further into housing 4. Movement of withdrawable switchgear unit 21 causes guide pin 84 to move along guide element 16 resulting in a shifting of shuttle 70, as shown in FIG. 11. In the service position blocking pin 87 extends through third aperture 57, as shown in FIG. 12. In this position, second position sensor actuator 116 activates second position sensor 112 indicating that withdrawable switchgear unit 21 is in the service position. Reversing the above procedure would facilitate removal of withdrawable switchgear unit 21.

At this point, it should be understood that the exemplary embodiments describe a blocking mechanism for both locking a withdrawable switchgear unit in one of a plurality of positions while also facilitating a transition between others of the plurality of positions. The blocking mechanism also includes position sensors that provide a user with feedback of the particular position of the withdrawal switchgear unit. It should also be understood that the particular shape/contour of the guide element may vary. In the present case, the guide element includes a start point and an end point that are laterally offset a distance that generally corresponds to a distance traveled by the shuttle between the disconnect position and the service position, however, the degree of lateral offset may vary.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A switchgear comprising:
a housing including first and second side walls and at least one shelf member, the at least one shelf member including a guide element;
a withdrawable switchgear unit slidingly supported on the at least one shelf member;
a blocking mechanism mounted to the withdrawable switchgear unit, the blocking mechanism including a guide pin arranged in the guide element and a blocking pin operatively connected to the guide pin, wherein the blocking pin selectively restricts movement of the withdrawable switchgear unit between at least two operational positions;
wherein the withdrawable switchgear unit includes a base member having an elongated slot, wherein the guide pin extends into the guide element through the elongated slot;
wherein the blocking mechanism includes a shuttle moveably mounted relative to the base member, the shuttle arranged to support both the guide pin and the blocking pin; and
wherein the blocking pin includes a first section having a first diameter and a second section having a second diameter that is smaller than the first diameter.

2. The switchgear according to claim 1, wherein the blocking pin is retractably mounted relative to the shuttle.

3. The switchgear according to claim 1, further comprising: a spring mounted to the blocking pin, the spring outwardly biasing the blocking pin relative to the shuttle.

4. The switchgear according to claim 1, wherein the base member includes an edge member having an elongated slot member including a dimension that is smaller than the first diameter and larger than the second diameter, the second section of the blocking pin extending through the elongated slot member.

5. The switchgear according to claim 4, wherein the edge member includes at least two apertures formed in the elongated slot member, each of the at least two apertures including a dimension that is larger than the first diameter and defining a corresponding one of the at least two operational positions.

6. The switchgear according to claim 1, further comprising: at least one position sensor mounted to one of the base member and the shuttle and at least one position sensor actuator mounted to the other of the base member and the shuttle.

7. A withdrawable switchgear unit comprising:
a blocking mechanism;
a guide pin extending from the blocking mechanism into a guide element of a switchgear; and
a blocking pin operatively connected to the guide pin, wherein the blocking pin selectively restricts movement of the withdrawable switchgear unit between at least two operational positions;
wherein the withdrawable switchgear unit includes a base member having an elongated slot, wherein the guide pin extends through the elongated slot;
wherein the blocking mechanism includes a shuttle moveably mounted relative to the base member, the shuttle supporting both the guide pin and the blocking pin, and
wherein the blocking pin includes a first section having a first diameter and a second section having a second diameter that is smaller than the first diameter.

8. The withdrawable switchgear unit according to claim 7, wherein the blocking pin is retractably mounted relative to the shuttle.

9. The withdrawable switchgear unit according to claim 7, further comprising: a spring mounted to the blocking pin, the spring outwardly biasing the blocking pin relative to the shuffle.

10. The withdrawable switchgear unit according to claim 7, wherein the base member includes an edge member having an elongated slot member including a dimension that is smaller than the first diameter and larger than the second diameter, the second section of the blocking pin extending through the elongated slot member.

11. The withdrawable switchgear unit according to claim 10, wherein the edge member includes at least two apertures formed in the elongated slot member, each of the at least two apertures including a dimension that is larger than the first diameter and defining a corresponding one of the at least two operational positions.

12. The withdrawable switchgear unit according to claim 7, further comprising: at least one position sensor mounted to one of the base member and the shuttle and at least one position sensor actuator mounted to the other of the base member and the shuttle.

13. The withdrawable switchgear unit according to claim 12, further comprising: a position sensor support mounted to the base member, the at least one position sensor being mounted to the position sensor support.

14. The withdrawable switchgear unit according to claim 7, further comprising: a lock member that engages with the blocking mechanism to restrict movement of the withdrawable switchgear unit.

* * * * *